United States Patent [19]

Mutte

[11] Patent Number: 4,746,308
[45] Date of Patent: May 24, 1988

[54] CARPET TILE FLOOR COVERING SYSTEM WITH ELECTRIC OR ELECTRONIC FUNCTIONS

[75] Inventor: Jean-Louis Mutte, Montmorency, France

[73] Assignee: Heuga France S.A.R.L., Les Ulis Cedex, France

[21] Appl. No.: 921,953

[22] Filed: Oct. 20, 1986

[51] Int. Cl.⁴ ............................................. H01R 4/24
[52] U.S. Cl. ........................................................ 439/426
[58] Field of Search ................... 339/20, 21, 22 R, 23, 339/96

[56] References Cited

U.S. PATENT DOCUMENTS

| | | | |
|---|---|---|---|
| 3,401,469 | 9/1968 | Shaver et al. | 339/96 |
| 3,809,966 | 5/1974 | Tirrell et al. | 339/96 |
| 4,578,731 | 3/1986 | Andriessen et al. | 339/96 |

*Primary Examiner*—Joseph H. McGlynn
*Attorney, Agent, or Firm*—Richard P. Crowley

[57] ABSTRACT

A carpet tile floor covering system which comprises a plurality of removable carpet tiles in a floor surface, at least one of which has an electric or electronic function, and which system includes spaced apart parallel conductive strips on the floor surface beneath the carpet tiles, and at least one pair of fixed terminal plugs in the said carpet tile, and an electric or electronic function device, such as an electric connector in said carpet tile, whereby electric voltage from a power supply to provide through the strips and terminal plugs to the electric or electronic device.

6 Claims, 2 Drawing Sheets

CARPET TILE FLOOR COVERING SYSTEM WITH ELECTRIC OR ELECTRONIC FUNCTIONS

DESCRIPTION

1. Field of the Invention

The present invention relates to a carpet tile floor covering system with electric or electronic functions.

2. Background of the Invention

A number of floors are already known having electric or electronic functions.

Thus the French Pat. No. 2 156 827 describes a floor formed of prefabricated rigid or semi-rigid panels having internal layers at different levels over the whole surface of the panel, said layers forming electric conductors separated by an insulating material. Such a floor is intended to be covered with carpeting or any other covering and requires a special and costly construction.

The patent U.S. Pat. No. 3,610,933 also describes a device for recovering current from a floor and having conducting layers disposed at different levels. This document calls forth the same remarks.

The European patent application No. 84 400 243.6, corresponding to U.S. Pat. No. 4,578,731 issued Mar. 25, 1986, describes a device for supplying an electric receiver with power in varying positions over a surface characterized in that it comprises on said surface a network of conducting strips of the same width spaced apart from each other and imbricated alternately, this assembly of strips being covered with a material such as textile carpeting and cooperating with a variable position current sensor whose feelers, in the form of needles, pass through the upper covering, this sensor being designed to provide a suitable power supply whatever its position. Such a device has the drawback of requiring networks of conducting strips to be laid or fixed with a very closely knit density. Furthermore, the electric or electronic applications are limited, in practice, to supplying a sensor forming a power socket which may be associated with an electric appliance.

The present invention proposes overcoming these drawbacks and providing a floor covering with electric or electronic functions which is extremely practical, for general purpose use, which allows extremely varied functions to be readily provided at any desired position and which does away with installing on the floor a large number of electric conductors.

Another objective of the invention is to ensure, from the floor covering, the integrality of the electric or electronic functions which are usually associated with placing conductors and devices on the vertical walls of a premises.

Another objective of the invention is to provide such a covering whose cost price is low.

SUMMARY OF THE INVENTION

The invention provides then a floor covering with electric or electronic functions formed of a plurality of floor tiles, preferably of the carpet tile type, characterized in that it comprises at least one tile having an electric or electronic function, said tile having under its lower face at least two, or preferably four, conducting terminals adapted for resting on flat conductors laid on the floor, said tile being incorporated in the covering formed by the plurality of tiles, a certain number of which do not have an electric or electronic function, so as to have an upper surface appearance identical to that of the other floor tiles, the whole of the tiles of the covering being perfectly removable, said at least one tile having an electric or electronic function resting, in electric contact by the terminals which it has on its lower face, on at least two parallel conducting strips laid on the floor and fed with very low voltage power.

The covering of the invention is preferably formed of carpet tiles having an upper wearing layer, particularly a textile layer, forming the visible face consisting preferably of a tufted, felted or woven layer, and an underlying seating or foundation layer for example bituminized or made from a material such as PVC and having considerable strength and rigidity, said seating layer resting on the floor, preferably through a sheet or film such for example as a non-woven synthetic fiber sheet.

The terminals on the lower face of the tile are disposed practically at the level of the lower face, while projecting preferably very slightly downwards. These terminals may either be formed of flattened studs or as required conducting strips fixed or bonded under the lower face of the tile.

In a preferred embodiment, the tile having the electric or electronic function has four terminals disposed respectively in the vicinity of the four sides of the tile when this latter has the shape of a quadrilateral, particularly square or rectangular, said terminals corresponding to opposite phases for two opposite sides, the very low voltage conducting strips being then advantageously disposed at the pitch of a row of tiles. Advantageously, particularly when several tiles having electric or electronic functions are not disposed in the same row, conducting strips may be provided laid on the floor parallel to each other and arranged so that a given conducting strip overlaps two adjacent edges of two adjacent tiles and supplies with power the terminal of each of the tiles disposed on the corresponding adjacent edge.

The electric or electronic functions provided by a tile may be of very varied kinds, it being understood that the tile has a thickness and an appearance identical to those of the other tiles of the covering which have no electric or electronic function, being preferebly formed exactly in the same way, more especially in the case of a carpeting tile, with an upper textile wearing layer and a lower seating layer, preferably bituminized or made from PVC.

Advantageously, the laminated nature of such a floor covering tile is used so as to contain, guide and/or hold in position electric elements which are either flat or in the form of a wire, as well as for providing the mechanical securing of such elements.

Thus, in the case of a tile intended to have on its upper face a visible connector raised with respect to the wearing layer, such for example as a power socket or a telephone, data processing or other connector, this element, socket or connector may advantageously have flat parts extending widthwise and allowing this element to be secured to the tile itself.

In the case of a tile comprising for example a pressure-sensitive network, for example actuated by the foot for detecting the presence of persons, particularly for alarm or supervision purposes, the flat detection element may advantageously be incorporated in the tile, for example between the seating layer and the upper wearing surface which may play the role of electric insulator.

Among the electric or electronic functions may also be mentioned:

incorporation in the thickness of the tile of light elements for example based on light emitting diodes for advertising, signalling or direction indication purposes;

the control, by pressure or through an actuator sensitive to the foot of diffferent functions such as lighting, heating, ventilation, etc.;

the low voltage power electric supply through a sensor such as described for example in the European patent application No. 84 400 243.6 on a tile comprising the wearing layer, at least one insulating material layer, two sets of conducting strips alternately imbricated in each other being connected to the terminals of the tile and disposed under said insulating material layer.

By very low voltage in the sense of the present invention is meant voltage for example of the order of 24 volts or less, preferably AC voltages, said voltages being prefereably provided for supplying, by means of a suitable transformer, most or the whole of the usual appliances and machines operating on the mains.

The invention also provides a floor covering which, while providing the known functions of a floor covering, of the carpet tile type, allows elements having different electric or electronic functions to be disposed at any desired position removably and interchangeably and in a perfectly modifiable way by simple transposition which may be accomplished by the user himself.

BRIEF DESCRIPTION OF THE DRAWINGS

Other advantages and characteristics of the invention will be clear from reading the following description, given by way of non-limitative example with reference to the accompanying drawings in which.

DESCRIPTION OF THE EMBODIMENTS

Figure 1:
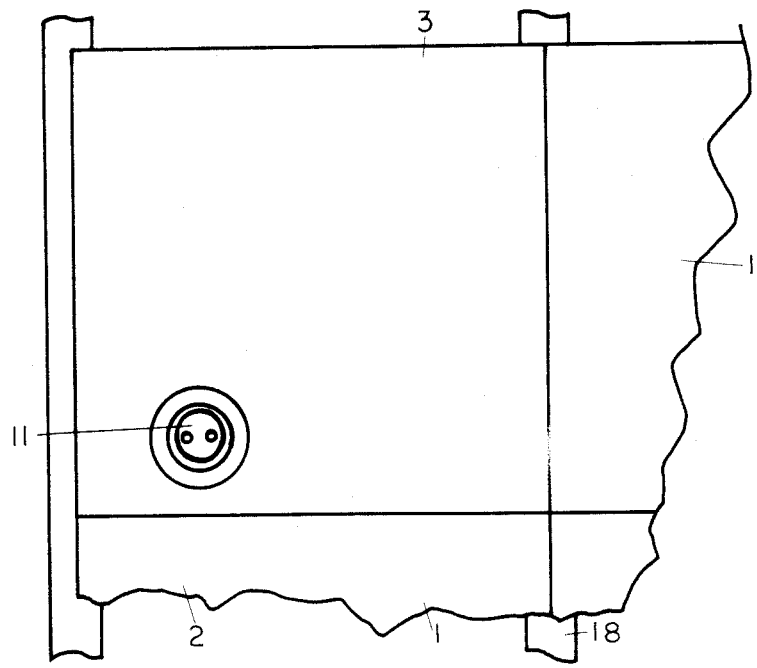
FIG. 1 shows a top view of a covering of the invention.
Figure 2:
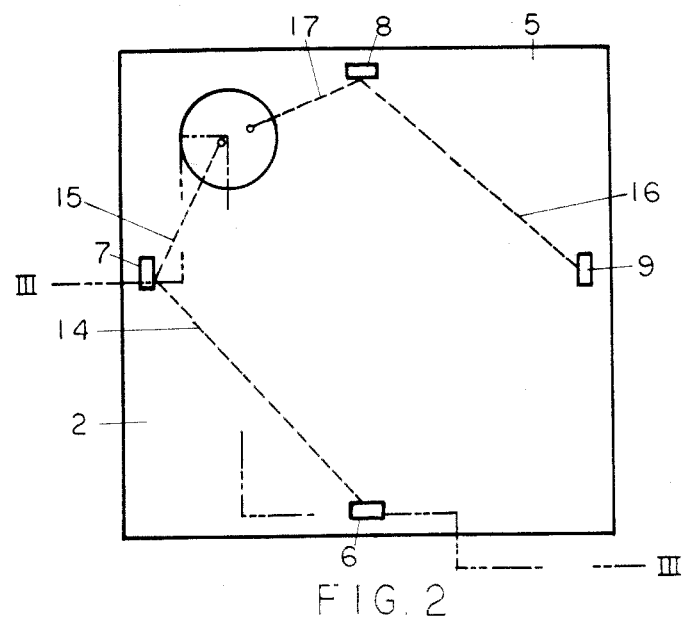
FIG. 2 shows a top view of a tile having a power take off function of this covering.
Figure 3:
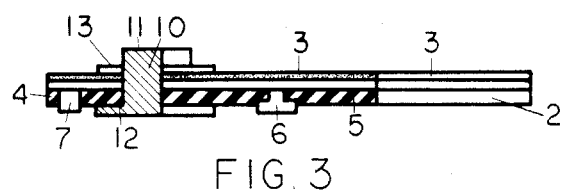
FIG. 3 shows a sectional view through III—III of FIG. 2.

The tiles shown in the drawings have a square shape and the dimensions are such that their side is between 25 cm and 2 mm.

The covering shown in FIG. 1 is formed of a plurality of ordinary carpeting tiles 1 and a tile 2 having an electric function, namely the presence of a 24 volt power socket. Tiles 1 and 2 comprise conventionally an upper wearing layer made from tufted textile material joined by a joining layer 4 to a lower bituminized seating layer 5. This layer 5 may be required to have on its lower face a thin non-woven sheet (not shown).

By way of example, the thickness of the textile wearing layer 3 is 6 mm, the thickness of the joining layer 4 is 2 mm and the thickness of the seating layer 5 is 8 mm.

In the seating layer 5 is embedded four copper studs, 6, 7, 8, 9, whose lower face emerges slightly below the lower face of the seating layer 5. These studs 6, 7, 8 and 9 pass through the seating layer 5.

Once the tile has been formed, a circular hole is formed passing through the whole of the tile and by which the body 10 of a female type power socket 11 is inserted, said body having at its base a thin base plate 12 which is applied against the lower face of the seating layer 5.

An upper ring 13 surrounds the emerging part of the socket body 10. This ring 13 may for example be screwed on to the body so that screwing thereof causes the part of the tile between the base plate 12 and ring 13 to be clamped. The thickness of the base plate is for example 2 mm.

Studs 6 and 7 on the orthogonal sides of the tile are connected by an insulated conducting wire 14. Terminals 6 and 7 therefore have the same polarity. Stud 7 is connected to an insulated conducting wire 15 going from stud 7 to one of the two connecting elements of socket 11. These wires 14, 15 may be disposed for example under the lower face of the wearing layer 5 and penetrate into the body of socket 10 through holes formed in this body. As a variant, they may be embedded in the seating layer 5 or run over the seating layer and be covered by the joining layer 4. Similar wires 16, 17 provide electric connection from studs 8 and 9 to the other connecting element of pin 11.

Before laying the covering formed of tile 1 and tile 2 on the floor, two or more conducting strips 18 are disposed on the floor whose polarities are alternate, while being connected to a low voltage AC power source. The two connectors 18 are disposed at the pitch of the width of the tiles. The lower face of each strip 18 is coated with a suitable insulating material so that the conducting foil of strip 18 is insulated from the floor. On the other hand, the upper metal face of the conducting layer 18 is visible. Then tiles 1 and 2 are laid, tile 2 being disposed at the desired position and it can be seen that in this arrangement the studs or terminals 9 come into contact with the upper face of the respective strips 18 which ensures the electric power supply of tile 2. Of course, if the tile is disposed in another orientation at 90°, it would be terminals 6 and 8 which would come into contact with strips 18.

Thus, it can be seen that the two connection elements of the socket are live and the socket may be used exactly like any wall socket.

Of course, the appearance presented by the floor covering thus designed is perfectly continuous, tile 2 only being distinguished from tiles 1 by the presence of socket 11. Tile 2 may be removed very easily and relaid at another position provided that conductors 18 are disposed at the desired position.

Figure 4:
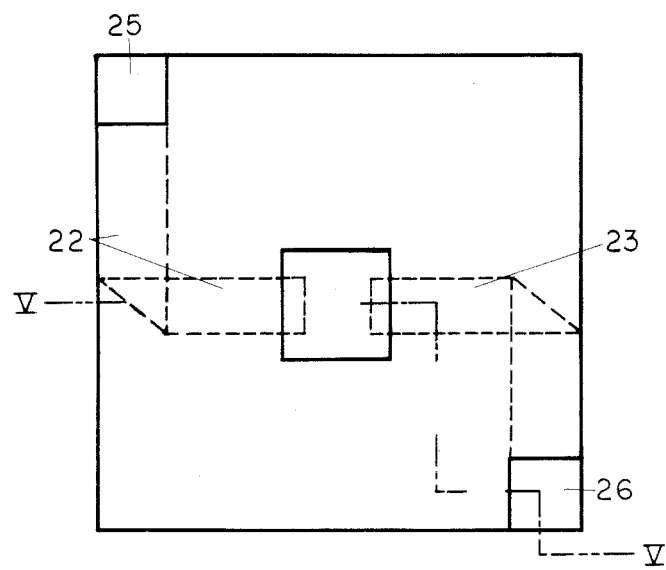
FIG. 4 shows a bottom view of a tile according to another embodiment of the invention.
Figure 5:
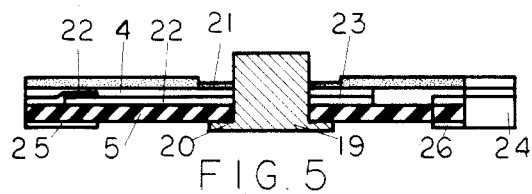
FIG. 5 shows a sectional view through V—V of FIG. 4.

The invention may comprise numerous variants and a tile has been shown in FIGS. 4 and 5 in such a variant. This tile provides any electric function and receives at its center, for this purpose, an electric device not otherwise identified 19 having a baseplate 20 and a lateral upper element 21 for fixing after the element has been inserted in a hole provided in the center of the tile.

On the seating layer 5, before positioning of the joining layer 4, two thin conducting strips 22, 23 have been placed which extend first of all towards the middle of each of the two opposite sides then, after a bend, one extends forwards and the other rearwards, parallel to the two sides. The result is that at a certain moment the strips 22, 23 emerge from a side such as can be seen at 24 for strip 23, and at this position the strips are bent back to pass under the tile. The ends thus bent back applied against the lower face of the seating layer 5 bear the reference 25, 26 and it can be seen that these bent back ends are disposed at two opposite apices of the square formed by the lower face of the tile. A suitable connection is provided at the center of the tile, between the conducting strips 22, 23 and the electric device 19. This may be provided, for example, by forming the central hole in the seating layer 3 before positioning the conductors 22, 23 and by providing at the level of the central hole projecting parts of conductors 22, 23 which may penetrate into suitable connection means of device 19. This device may for example be a light source or a loud speaker or any appliance.

It will be understood that the ends 25, 26 of conductors 22, 23 which are disposed at the two apices are each distributed on two perpendicular sides of the tile so that, whatever the orientation in which the tile is placed on the two conductors 18, the electric device 19 is supplied with power.

Of course, it will be understood that the electric devices 11, 19 may be replaced in the tiles described by any other device. Thus, for example, the device may be replaced by a known layer sensitive to the pressure for forming a pressure sensor, this layer being for example bonded between layer 5 and layer 4. The result is that a detector is obtained for detecting the passage of a person. Advantageously, a means may be associated with the circuit formed by strips 1 so that a detection signal is produced not only when a person walks over the tile but also when a person tries to raise the tile, causing the interruption of a circuit and so the detection of the attempt to disconnect the alarm tile.

Although the invention has been described in connection with a particular embodiment, it is of course in no wise limited thereto and different modifications of forms and materials may be made thereto without for all that departing from the scope and spirit of the invention.

What is claimed is:

1. A carpet tile floor covering system which comprises, in combination:
    (a) a flooring surface;
    (b) a plurality of removable carpet tiles on said floor surface, the carpet tiles having a visible wear surface and a foundation layer with a lower face, at least one carpet tile having an electric or electronic function and which electric function carpet tile comprises:
       (i) a fixed electrical function means secured through the carpet to provide an electrical connection on the wear surface of the electric carpet tile;
       (ii) first and second, electrically spaced apart terminals in the said lower face of the foundation layer, the first and second terminals provide respectively for the electrical conduction of opposite electrical phases; and
       (iii) electrical wire means to connect electrically the first and second of said terminals to the said electric function means;
    (c) generally parallel, first and second, electrically conducting strip means on the same general plane on said flooring surface and positioned to provide electrical power of opposite electrical phases to the said first and second electrical terminals; and
    (d) a low voltage power supply means to provide electrical power to said first and second conducting strips whereby low voltage electrical power is provided from the source through said conducting strips to said terminals and to said electrical function means on the carpet face.

2. The system of claim 1 wherein said first and second electrically conducting strip means are positioned on said flooring surface to overlap the edges of two adjacent electrical function tiles to supply each of the adjacent tiles with power from the electrically conductive strip means.

3. The system of claim 1 wherein said first and second terminals comprise four, spaced apart terminal studs extending from the foundation layer, each in the vicinity of a respective side of the electrical carpet tile, said studs corresponding to opposite electrical phases for two opposite sides of the electric carpet.

4. The system of claim 1 wherein the electrical function means comprises an electrical socket extending through the thickness of the carpet and having a base plate in the face of the foundation layer and retaining ring on the face surface to retain the electrical socket in position.

5. The system of claim 1 wherein the carpet tiles comprise an upper textile wear surface and wherein the foundation layer comprises a polyvinyl chloride or a bitumen layer.

6. The system of claim 1 wherein the carpet tile comprises a square-shaped carpet tile wherein the first and second terminal means comprises four embedded metal studs, the lower face of said studs each emerging slightly below the lower face of the foundation layer, and wherein said four stud terminals are disposed respectively in the vicinity of the four sides of the said carpet tile, that said terminal studs corresponding to opposite phases for the two opposite sides of the carpet tile.

* * * * *